United States Patent
Berck et al.

(10) Patent No.: US 7,693,840 B1
(45) Date of Patent: Apr. 6, 2010

(54) METHOD AND SYSTEM FOR DISTRIBUTION OF COMMON ELEMENTS

(75) Inventors: David V. Berck, Olathe, KS (US); Jeffery A. Mau, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 831 days.

(21) Appl. No.: 10/903,755

(22) Filed: Jul. 30, 2004

(51) Int. Cl.
*G06F 17/30* (2006.01)
*G06F 15/16* (2006.01)

(52) U.S. Cl. ............... 707/10; 707/200; 709/203
(58) Field of Classification Search ............ 707/10, 707/200–201; 709/203, 224
See application file for complete search history.

(56) References Cited

U.S. PATENT DOCUMENTS

| | | | |
|---|---|---|---|
| 5,459,837 A * | 10/1995 | Caccavale | 709/226 |
| 5,592,626 A * | 1/1997 | Papadimitriou et al. | 718/102 |
| 5,732,218 A * | 3/1998 | Bland et al. | 709/224 |
| 5,805,824 A * | 9/1998 | Kappe | 709/242 |
| 5,862,325 A * | 1/1999 | Reed et al. | 709/201 |
| 5,915,095 A * | 6/1999 | Miskowiec | 709/223 |
| 5,918,229 A * | 6/1999 | Davis et al. | 707/10 |
| 5,933,596 A * | 8/1999 | Mayhew | 709/203 |
| 5,933,606 A * | 8/1999 | Mayhew | 709/239 |
| 5,956,489 A * | 9/1999 | San Andres et al. | 709/221 |
| 5,983,227 A * | 11/1999 | Nazem et al. | 707/10 |
| 6,108,703 A * | 8/2000 | Leighton et al. | 709/226 |
| 6,167,427 A * | 12/2000 | Rabinovich et al. | 709/201 |
| 6,230,196 B1 * | 5/2001 | Guenthner et al. | 709/223 |
| 6,272,472 B1 * | 8/2001 | Danneels et al. | 705/27 |
| 6,421,733 B1 * | 7/2002 | Tso et al. | 709/246 |
| 6,591,266 B1 * | 7/2003 | Li et al. | 707/10 |
| 6,643,652 B2 * | 11/2003 | Helgeson et al. | 707/10 |
| 6,647,393 B1 * | 11/2003 | Dietterich et al. | 707/102 |
| 6,782,379 B2 * | 8/2004 | Lee | 707/2 |
| 6,792,615 B1 * | 9/2004 | Rowe et al. | 725/37 |
| 6,883,028 B1 * | 4/2005 | Johnson et al. | 709/226 |
| 6,957,394 B1 * | 10/2005 | Fernandez et al. | 715/760 |
| 6,973,483 B2 * | 12/2005 | Hewett et al. | 709/213 |
| 7,028,262 B2 * | 4/2006 | Estrada et al. | 715/751 |
| 7,072,911 B1 * | 7/2006 | Doman et al. | 707/201 |
| 7,130,885 B2 * | 10/2006 | Chandra et al. | 709/206 |
| 7,185,007 B2 * | 2/2007 | Yagi | 707/4 |

(Continued)

OTHER PUBLICATIONS

Interwoven, Interwoven Content Distribution, www.interwoven.com/products/content_distribtuion, Jan. 19, 2005, 2 pgs.

(Continued)

*Primary Examiner*—Miranda Le (57) ABSTRACT

A system for updating web page common elements is provided. The system includes a distribution component that is operable on a first server. The distribution component transfers new common elements provided on the first server to a plurality of other servers that may be geographically dispersed. The plurality of other servers are each provided with a distribution agent that is operable to receive the common element and to store the common element in a directory on each of the plurality of other servers. The common code elements may be common elements, for example, on one or more enterprise web pages. A method for updating common elements for enterprise web pages is also provided.

15 Claims, 3 Drawing Sheets

U.S. PATENT DOCUMENTS

| | | | | |
|---|---|---|---|---|
| 2002/0065955 | A1* | 5/2002 | Gvily | 709/330 |
| 2004/0205163 | A1* | 10/2004 | Yagi | 709/219 |
| 2005/0108648 | A1* | 5/2005 | Olander et al. | 715/744 |
| 2006/0156220 | A1* | 7/2006 | Dreystadt et al. | 715/501.1 |
| 2006/0242578 | A1* | 10/2006 | Van Steenbergen et al. | 715/700 |
| 2007/0118630 | A1* | 5/2007 | Hashimoto et al. | 709/223 |

OTHER PUBLICATIONS

Apache Tutorial: Introduction to Server Side Includes, httpd.apache.org, Jan. 19, 2005, 7 pgs.

About Windows Update, v4.windowsupdate.microsoft.com, Jan. 19, 2005, 3 pgs.

Web Services Activity, www.w3.org/2002/ws, Jan. 19, 2005, 5 pgs.

\* cited by examiner

*FIG. 5*

METHOD AND SYSTEM FOR DISTRIBUTION OF COMMON ELEMENTS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to computer software for distribution of information, and more particularly, but not by way of limitation, to a system and method for distributing common elements to geographically diverse computer systems.

BACKGROUND OF THE INVENTION

Enterprises commonly maintain a corporate web site to enhance public awareness of the enterprise, to provide information about career opportunities within the enterprise, and possibly to enable electronic access to the services or the products provided by the enterprise. A large enterprise may maintain clusters of web servers located at many geographically diverse locations to assure that the corporate web servers are able to handle the maximum load that may be placed on the corporate web and to provide that there is not a single point of failure which can bring down their corporate web presence.

The rapid, frequent, and organic expansion of enterprise web sites presents a challenge to web masters to maintain consistency of common elements across all the enterprise web servers. Common elements may include common corporate navigation headers including, for example, home, careers, products, and investor information links that are desirable to place at the top of all web pages. Common elements may also include common corporate footers, including a corporate logo, copyright notices, proprietary information notices, and other information that are desirable to place at the bottom of all web pages. Common elements may include cascading style sheets that define a common style for web pages. The incremental addition of new servers to the enterprise web as well as partitioning of servers into virtual servers also add to the challenge of maintaining consistency across the enterprise web.

SUMMARY OF THE INVENTION

According to one embodiment, a system for updating web page common elements is provided. The system includes a distribution component that is operable on a first server. The distribution component transfers new common elements provided on the first server to a plurality of other servers that may be geographically dispersed. The plurality of other servers are each provided with a distribution agent that is operable to receive the common element and to store the common element in a directory on each of the plurality of other servers. The common code elements may be common elements, for example, on one or more enterprise web pages.

In another embodiment, a method for providing a web page with common elements is provided. The method includes sending at least one common element from a first server to a directory on a plurality of other servers including a second server. The method includes requesting a page from the second server, and parsing the page. The method includes inserting the at least one common element into the page, and returning the page. The method includes displaying the page with the at least one common element in the page.

In yet another embodiment, a system for updating web page common elements is provided. The system includes a distribution component, a distribution agent, and a server component. The distribution component is operable on a first server to transfer a common element to at least a second server and a third server. The distribution agent is on operable on each of the second and third servers to receive the common element and to store the common element in a directory on or accessible by each of the second and third servers. The server component is operable in response to a request for a page to compose the page using at least the common element. The server component is also operable in response to the second server being unavailable to obtain the common element from the third server.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

Maintaining consistency among common elements across a corporate web may be difficult. Common elements may include corporate logos, corporate navigation headers, corporate footers, cascading style sheets, files referred to by server side includes, executable code fragments, and other common elements. While some files may be linked at one specific location, significant risk may be associated with relying on a single source to be continuously available. This may be referred to as a single point of failure, as a failure of a centralized server—whether the centralized server is a single server machine or a cluster of server machines—causes the corporate web to fail and to be unavailable. In other cases, the common elements are portions of a complete file and must be inserted into a web page and it is undesirable to link to a separate location to obtain the portions of the complete file. What is desirable is a system and method to provide and consistently maintain the common elements for static and dynamic web pages across a diverse enterprise web, which may encompass multiple independent universal reference locator (URL) domains and may include many geographically separated servers.

Figure 1:
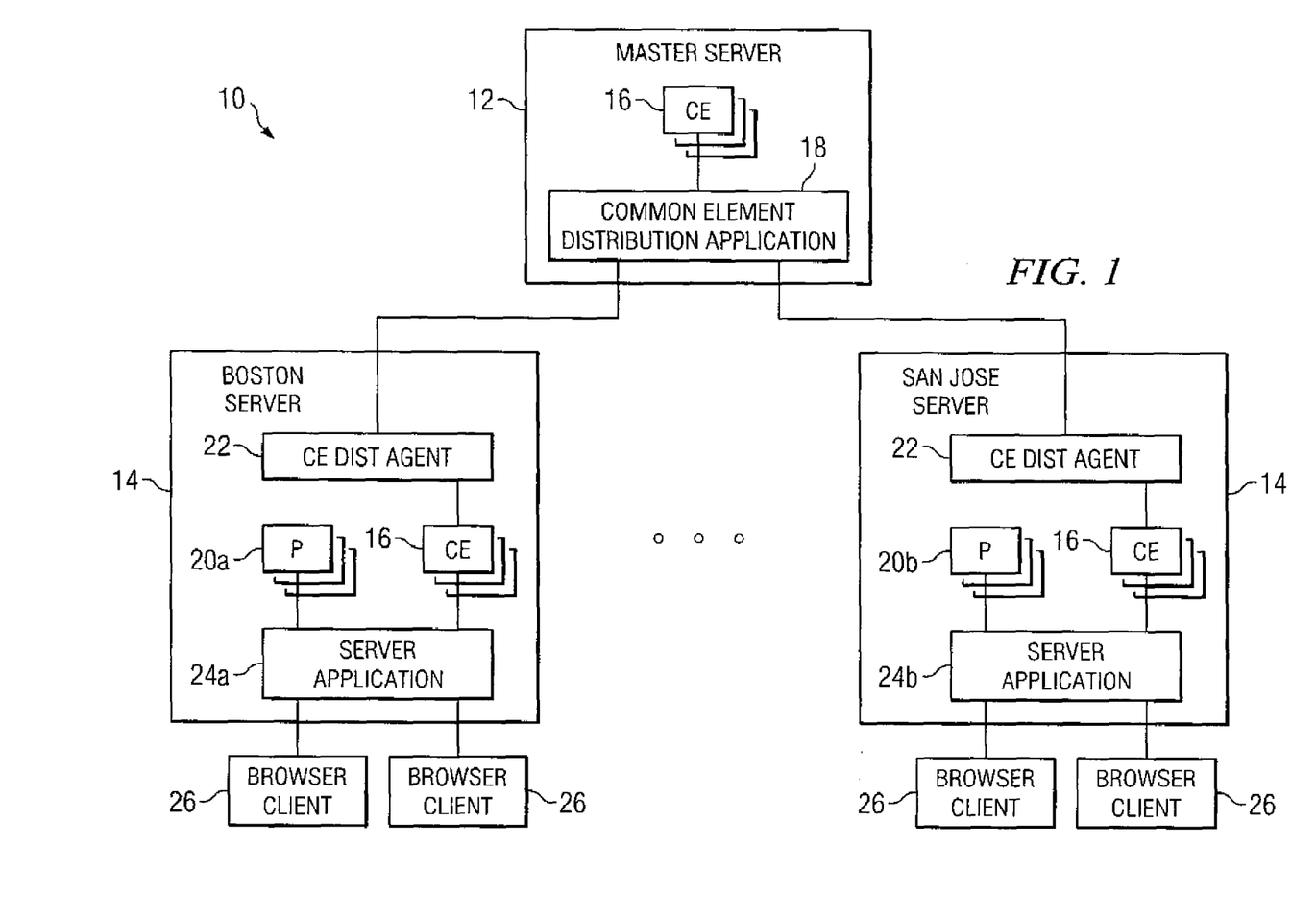
FIG. 1 is a block diagram of a common element distribution system according to an embodiment of the present disclosure.

Turning to FIG. 1, a common element distribution system 10 is depicted. The common element distribution system 10 includes a master server 12 and a plurality of servers 14—for example, a first server 14a and a second server 14b. The servers 14 may be web servers or application servers. In an embodiment, there may be many more servers 14 than depicted in FIG. 1. The master server 12 includes a plurality of common elements 16 and a common element distribution application 18. The master server 12 provides a copy of the common elements 16 to one of the servers 14 on initialization, for example when one of the servers 14 is first brought into service, and provides a copy of the common elements 16 to the servers 14 when the common elements 16 are updated. The master server 12 and the servers 14 are general purpose computer systems. General purpose computer systems are discussed in greater detail hereinafter.

The servers 14 each include the common elements 16, a plurality of pages 20—a first plurality of pages 20a and a second plurality of pages 20b—and a server application 24—a first server application 24a and a second server application 24b. The server applications 24 may be web server applications or application server applications. The web server applications and/or application server applications may be provided by third parties, such as a Web Logic, Apache, iPlanet, or TomCat server application 24. The server applications 24 are computer programs.

A browser client 26 sends a request for a page document to the server 14. Responsive to the request, the server application 24 composes the page document from the page 20 and one or more common elements 16 referenced by the page 20 and sends the page document to the browser client 26. Note that according to an embodiment, the server application 24 composes the requested page document entirely from data or information, for example common elements 16 and pages 20, stored on the server 14. In this embodiment, there is no single point of failure for requesting the page document. If a particular server 14, for example the first server 14a, fails and goes out of service, requests for the page document from the browser client 26 are redirected to an alternate server 14, for example to the second server 14b.

The pages 20 provide at least a part of the page document which the browser client 26 requests and displays. The pages 20 may comprise hyper text markup language (HTML), java server pages (JSPs), active server pages (ASPs), tool command language (Tcl), Perl, or other instructions or tags. The pages 20a and the pages 20b may be different pages or they may be copies of the same pages 20. The pages 20, for example, may include a home page of an enterprise and pages accessible from the home page to provide information on career opportunities within the enterprise, financial and product information for investors, and other similar pages.

At least some of the pages 20 contain references to one or more of the common elements 16. The common elements 16 may include bit maps, Joint Photographic Experts Group (JPEG) files, segments of HTML, cascading style sheets, blocks or segments of computer programs, and other information useful in composing the page document. For example, a bit map of the corporate logo may be a common element 16. For example, one of the common elements 16 may provide a block of HTML that defines a common upper navigation bar. The pages 20 may reference the common elements 16 with server side includes, with HTML tags, or with other references. When a request for the page document is received from the browser client 26 by the server application 24, the server application 24 parses or reads one of the pages 20. When the server application 24 reads a reference to one of the common elements 16 when parsing the page 20, the server application 24 looks up the common element 16 in a specific directory area of the server 14 and inserts the common element 16 into the page document. In an embodiment, the server application 24 may be configured with the identification or location of the specific directory area.

The servers 14 may be located at geographically separated locations. For example, the first server 14a may be located in Boston, Mass., while the second server 14b may be located in San Jose, Calif. The placement of the servers 14 with identical or similar content at geographically separated locations may be referred to as "geo-redundancy," and the servers 14 so located may be said to be "geo-redundantly located." Geo-redundancy reduces the probability that all of an enterprise's servers 14 may be put out of service at the same time, for example by a single fiber optic line cut, a natural disaster, or a single terrorist attack. The servers 14 may each be composed of multiple computers, and hence each server 14 may be called a server cluster.

The master server 12 may be a single computer or multiple computers arranged in a server cluster. Alternately, the master server 12 may be composed of geo-redundant computers with provisions for failing over from the master server 12 having the primary role to the master server 12 having the backup role. Note, however, that each server 14 contains all of the information needed to compose the page document, including the pages 20 and the common elements 16, and hence the temporary loss of the master server 12 does not take the servers 14 out of service. Loss of the master server 12 only delays, potentially, the distribution of updated common elements 16 to the servers 14.

The common element distribution agent 22 may register with the common element distribution application 18 when the server 14 is first brought into service. Servers 14 may be brought into service from time to time in order to provide additional load handling capacity as requests from browser clients 26 increase. At the time the common element distribution agent 22 registers with the common element distribution application 18, the common element distribution application 18 may send all of the common elements 16 to the server 14 being brought into service.

The common element distribution application 18 monitors the common elements 16 and takes notice when one of the common elements 16 is updated. The common element distribution application 18 may examine the common elements 16 on a periodic basis, for example hourly, and determine that an update of the common element 16 has occurred, for example if a timestamp of a file storing the common element 16 is later than the time of the prior examination period. Alternately, some other means for determining when one of the common elements 16 is updated may be employed. For example, the administrator may notify the common element distribution application 18 manually, or the common element distribution application 18 may automatically review all common elements 16 on a periodic basis for updates. After one of the common elements 16 is updated, the common element distribution application 18 sends the common elements 16 that have been updated to each of the servers 14.

The common element distribution application 18 may send the common elements 16 that have been updated to each of the servers 14 immediately and with no preliminary messaging with the servers 14. In another embodiment, the common element distribution application 18 may send an update notification to each of the servers 14 identifying the common elements 16 that have been updated and the timestamp associated with the common elements 16. In this case, each server 14 may send a request to receive the specific updated common elements 16 to the common element distribution application 18 at a time which is convenient for the server 14 to receive the updated common elements 16. This may permit the server 14 to manage its work load better. In another embodiment, the servers 14 may poll the common element distribution application 18 on a periodic basis to request updated common elements 16, without receiving any update notification from the common element distribution application 18.

The common element distribution application 18 may send the common elements 16 directly to the servers 14 via HTML, via secure HTML, via a file transfer protocol (FTP) session, or by some other means. Alternately, the common element distribution application 18 may interact with the common element distribution agent 22 located on each server 14 to manage sending of the common elements 16. In each of these cases, the common elements 16 are copied to specific directories on the servers 14 where the server application 24 may be configured to search for the common elements 16 when building the page documents.

The common elements 16 sent to the servers 14 may be immediately available for composing page documents. Alternately, the updated common elements 16 may be unavailable until a common scheduled time or until a condition is satisfied. For example, the common elements 16 may be sent to the servers 14, but the common element distribution agent 22 on each of the servers 14 may make the updated common elements 16 available at a coordinated, scheduled time, for example by changing a reference or soft link pointing to a directory containing the common elements 16. This scheme may require the common element distribution application 18 to send a message to the servers 14 commanding the transition to the updated common elements 16 at a specified time. In this case, the common element distribution application 18 may require each common element distribution agent 22 to confirm receipt of the updated common elements 16 before the common element distribution application 18 sends the transition command to the servers 14. These and other handshaking and coordinating mechanisms are contemplated for synchronizing the distribution of common elements 16.

The common element distribution system 10 described above provides relief from a tedious and error prone manual task of updating many servers 14 in a large enterprise. The common element distribution system 10 also provides a means to synchronize updates of common elements 16 so that different common elements 16 are not built into what are supposed to be identical document pages. In some cases, there may be undesirable legal or other ramifications of having otherwise identical document pages built differently, if even only temporarily during the process of manually updating all common elements 16, by the server applications 24 located on different servers 14.

Metatags are an HTML construct that provide a means of supporting informational purposes not directly related to the content of a single HTML page. Metatags may be employed to define key words for search engines. With the common element distribution system 10, metatags may be embedded in an HTML file referenced by a server side include in the page 20. The HTML file may be treated as a common element 16. When the page 20 is parsed to build the page document, the server side include referencing the HTML file containing the metatags is encountered, the HTML file containing the metatags is inserted into the page document, and the metatags are therefore embedded in the page document. The key words defined in metatags may be kept uniform across an enterprise and uniformly updated by making the HTML file containing the metatags one of the common elements 16. A plurality of cascading style sheets may also be kept uniform across an enterprise in a similar manner. The cascading style sheets may be defined in a portion of an HTML header which is referred to by a server side include. If the portion of the HTML header containing the cascading style sheets is treated as a common element 16, then updates to the cascading style sheets are distributed uniformly to all servers 14 by the common element distribution system 10.

Applications such as JSPs or ASPs may contain references to instructions outside of the application, for example a call to lookup a monthly phone bill in a data store. When the application provides a dynamic page document to a browser client 26, the references to instructions outside of the application are executed and the associated information is composed into the dynamic page document served to the browser client 26. The common element distribution system 10 provides opportunities for updating applications, for example JSPs and ASPs, by recasting segments of the applications that were formerly static instructions as references to instructions outside the application that may be treated as common elements 16 and hence may be uniformly updated.

Figure 2:
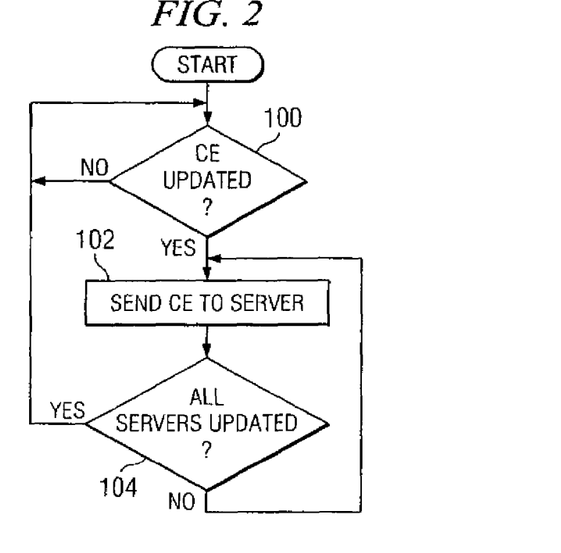
FIG. 2 is a flow chart of a method of distributing updated common elements according to an embodiment of the present disclosure.

Turning now to FIG. 2, a flow chart of a method of updating common elements 16 is depicted. The method continues to loop on block 100 until some common element 16 is updated. The method proceeds to block 102, where the updated common element 16 or common elements 16 are sent to one of the servers 14. The servers 14 may be identified on the basis of the servers 14 having registered to receive the updates of the common elements 16 or by some other means. The method proceeds to block 104 where, if all the servers 14 have not received the updated common elements 16, the method returns to block 102. By looping through blocks 102 and 104 all the servers 14 are sent the updated common elements 16. The method proceeds to block 100 where the method again loops until another common element 16 is updated.

Figure 3:
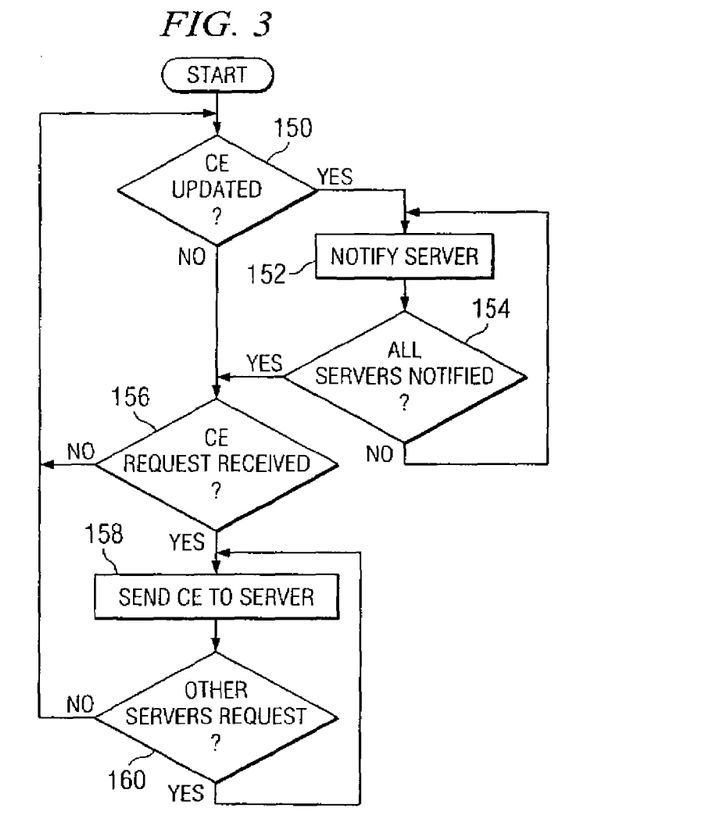
FIG. 3 is a flow chart of a method of distributing updated common elements according to another embodiment of the present disclosure.

Turning now to FIG. 3, a flow chart of an alternate method of updating common elements 16 on servers 14 is depicted. In block 150, if a common element 16 has been updated the method proceeds to block 152. In block 152, a notification of the common element 16 or common elements 16 which have been updated is sent to one of the servers 14. The servers 14 may be identified on the basis of the servers 14 having registered to receive notification of updates of common elements 16 or by some other means. The notification may include a list of recently updated common elements 16 and the timestamp of each of the updated common elements 16. The method proceeds to block 154 where, if all servers 14 have not been notified of the update to the common elements 16, the method returns to block 152. By looping between block 152 and 154 all of the servers 14 are notified of the update to the common elements 16. The method proceeds to block 156.

In block 156, if no request for updated common elements 16 has been received, the method loops back to block 150. Assuming no common element 16 has been updated since the previous passage through block 150, the method proceeds to block 156. Hence, the method loops through block 150 and block 156 until a request for updated common elements 16 is received from one of the servers 14. When a request for updated common elements 16 is received from one of the servers 14, the method proceeds to block 158. In block 158, the updated common elements 16 are sent to the server 14 that requested the update. The method proceeds to block 160 where if no request for updated common elements 16 has been received from a different server 14, the method returns to block 150. By looping through blocks 150, 156, 158, and 160 all of the servers 14 are sent the updated common elements 16.

In one embodiment, after all servers 14 have requested and received the updated common elements 16, the common element distribution application 18 sends a command to the common element distribution agents 22 on each of the servers 14 to make the updated common elements 16 available to the server applications 24 for composing page documents.

In one embodiment, one of the servers 14 may register with the common element distribution application 18, and the common element distribution application may respond by sending a notification of all common elements 16 to the server 14. In this case, the server 14 may then send a request for updated common elements covering all the common elements 16.

Figure 4:
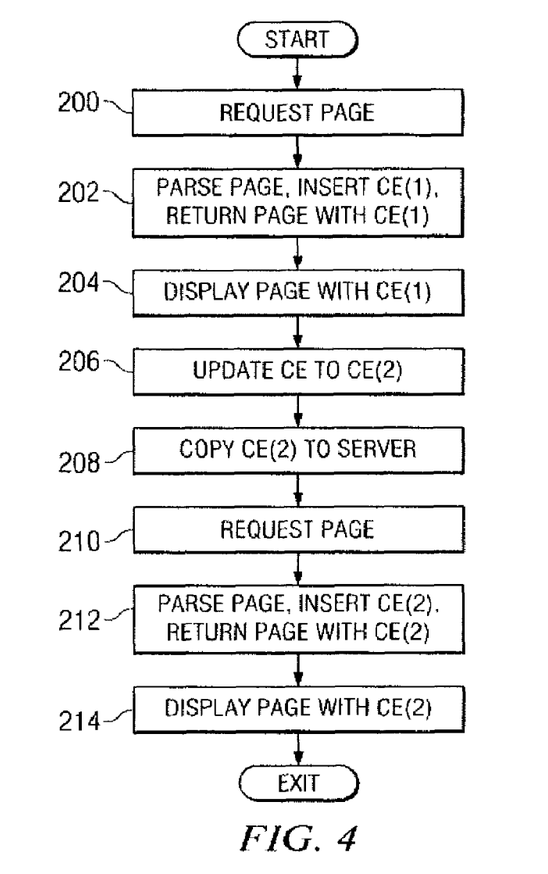
FIG. 4 is a flow chart of a method for accessing a page document according to an embodiment of the present disclosure.

Turning to FIG. 4, a method for serving pages in the context of the common element distribution system 10 is depicted. At block 200, a browser client 26 requests the page document. The method proceeds to block 202, where the server application 24 parses the page 20, inserts one of the common elements 16 dated time1, and returns the page document embedding the common element 16 dated time1 to the browser client 26. The method proceeds to block 204, where the browser client 26 displays the page document including the common element 16 dated time1.

The method proceeds to block 206, where the common element 16 dated time1 is changed and comes to be dated time2. The method proceeds to block 208, where the common element 16 dated time2 is sent to the servers 14.

The method proceeds to block 210, where a browser client 26 requests the page document. The method proceeds to block 212, where the server application 24 parses the page 20, inserts one of the common elements 16 dated time2, and returns the page document embedding the common element 16 dated time2 to the browser client 26. The method proceeds to block 214, where the browser client 26 displays the page document including the common element 16 dated time2.

Figure 5:
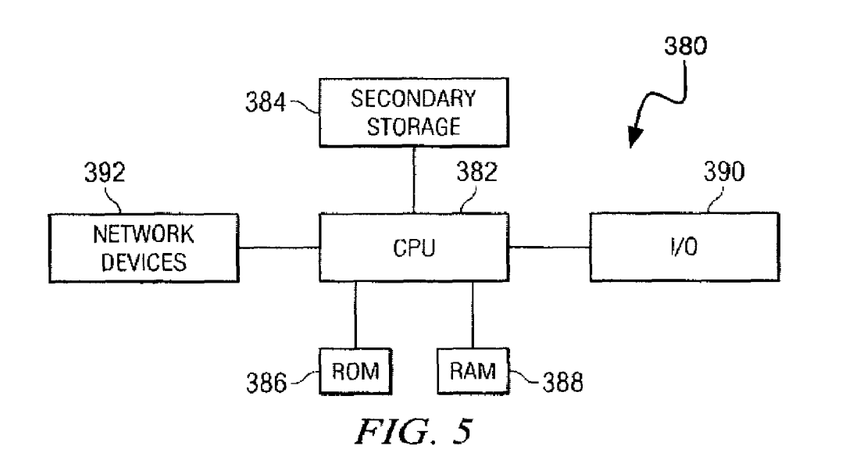
FIG. 5 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 5 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as Global System for Mobile Communications (GSM) radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity 392 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, which may be referred to herein as transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown as directly coupled or communicating with each other may be coupled through some interface or device, such that the items may no longer be considered directly coupled to each but may still be indirectly coupled and in communication with one another. Other examples of changes, substitutions, and alterations are ascertainable by one skilled in the art and could be made without departing from the spirit and scope disclosed herein.

What is claimed is:

1. A system for updating web page common elements, comprising:
   a first server computer;
   a distribution component on the first server computer that transfers a common element to a plurality of other server computers, wherein the common element is at least one of a navigation link and an information element;
   a distribution agent operable on each of the other server computers that receives the common element and stores the common element in a directory, wherein the distribution agent registers with the distribution component and provides information for the distribution component to transfer the common element to the distribution agent; and
   a server component operable on each of the other server computers that, in response to a request from a client for a page containing the common element, parses the page, inserts at least the common element from the directory into the page, returns the page to the client to promote displaying the page with at least the common element from the directory of one of the plurality of other server computers,
   wherein the distribution component detects when the common element is changed and sends a message about the change of the common element to the distribution agent and wherein the distribution agent responds to the message about the change by sending a request to the distribution component to send the common element to the distribution agent, and
   wherein the distribution component makes the common element in the directory available to the server component on each of the other server computers at a scheduled time.

2. The system of claim 1, wherein distribution application sends a message containing the scheduled time to the distribution agent.

3. The system of claim 2, wherein the distribution application depends upon the distribution agent first confirming the receipt of the common element to the distribution application before sending the message containing the scheduled time.

4. The system of claim 1, wherein the distribution agent makes the directory available by assigning a soft link to reference the directory.

5. The system of claim 1, wherein the page is either a dynamic page or a static page.

6. The system of claim 1, wherein at least one of the other server computers is an application server.

7. The system of claim 1, wherein at least some of the other server computers are geo-redundant.

8. The system of claim 1, wherein the information element includes at least one of a footer, a logo, a copyright notice, and a proprietary information notice.

9. A computer implemented method for providing a web page, comprising:
   registering with a first server computer by each of a plurality of other server computers to receive common elements from the first server;
   detecting a change by the first server computer in at least one common element;
   sending a message by the first server computer to the plurality of other server computers about the change of the at least one common element;
   responding to the message by each of the plurality of other server computers with a request to send the at least one common element;
   for each of the plurality of other server computers, responsive to the first server computer receiving the request from a corresponding one of the plurality of other server computers, sending the at least one common element from the first server computer to a directory on the corresponding one of the plurality of other server computers, wherein the at least one common element is at least one of a navigation link and an information element;
   making the at least one common element available from the directory to a server application on each of the plurality of other server computers, including a second server computer at a scheduled time;
   receiving a request for a page by the server application on the second server from a client;
   parsing the page and inserting the at least one common element into the page by the server application on the second server; and
   sending the page with the at least one common element to the client by the second server for display by the client.

10. The computer implemented method of claim 9, further including:
    detecting a subsequent change by the first server computer to the at least one common element;
    sending the subsequently changed at least one common element from the first server to the directory on the plurality of other server computers;
    receiving a request for the page by the server application on the second server from the client;
    parsing the page and inserting the subsequently changed at least one common element into the page by the server application on the second server;
    sending the page with the subsequently changed at least one common element to the client by the second server for display by the client.

11. The computer implemented method of claim 10, wherein the page is either a static page or a dynamic page.

12. The computer implemented method of claim 10, wherein at least one of the other server computers is an application server.

13. The computer implemented method of claim 10, wherein at least some of the other server computers are geo-redundant.

14. A system for updating web page common elements, comprising:
    a first server computer;
    a distribution component on the first server computer that transfers a common element to at least a second server computer and a third server computer, wherein the common element is at least one of a navigation link and an information element;
    a distribution agent on each of the second and third server computers that receives the common element and stores the common element in a directory accessible by each of the second and third server computers, wherein the distribution agent registers with the distribution component and provides information for the distribution component to transfer the common element to the distribution agent; and a server component on each of the second and third server computers that, in response to a request from a client for a page containing the common element, parses the page, inserts at least the common element from the directory into the page, returns the page to the client to promote displaying the page with at least the common element, the server component, in response to the second server computer being unavailable, obtains the common element from the third server computer, wherein the distribution component detects when the common element is changed and sends a message about the change of the common element to the distribution agent and wherein the distribution agent responds to the message about the change by sending a request to the distribution component to send the common element to the distribution agent, and wherein the distribution component makes the common element in the directory available to the server component on the second and third server computers at a scheduled time.

15. The system of claim 14, wherein the server component redirects requests for the common element to one of a plurality of server computers including the second and third server computers in response to one of the plurality of server computers being unavailable.

* * * * *